Figure 3:
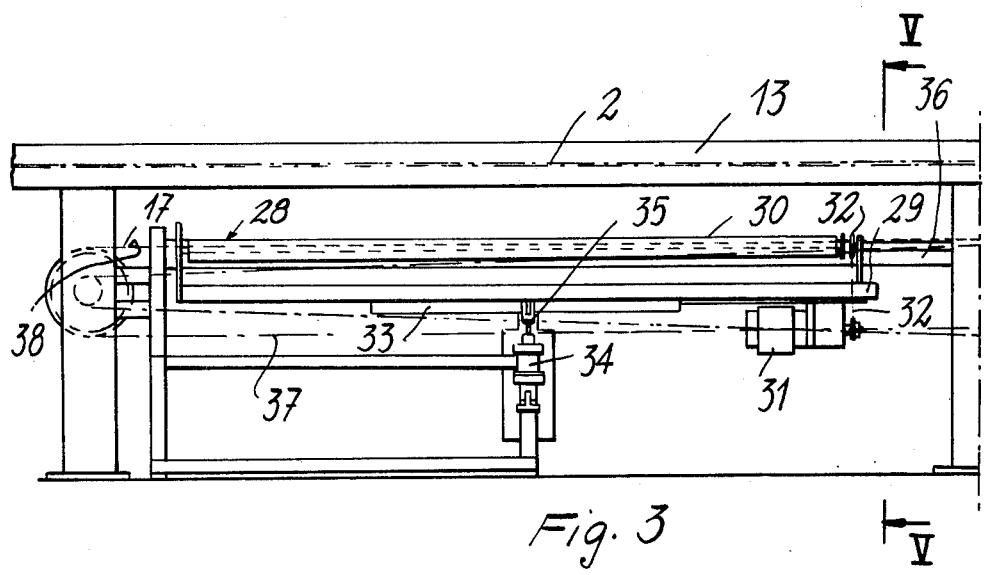

United States Patent [19]

Frigo

[11] 4,022,091

[45] May 10, 1977

[54] MACHINE FOR DRESSING CONTINUOUS WEB MATERIALS IN STRETCHED CONDITION ON A PLURALITY OF FRAMES

[75] Inventor: Vito Frigo, Cervignano del Friuli (Udine), Italy

[73] Assignee: Ausatuft S.p.A., Udine, Italy

[22] Filed: Sept. 3, 1975

[21] Appl. No.: 609,923

[30] Foreign Application Priority Data

Sept. 17, 1974 Italy .................................. 27357/74

[52] U.S. Cl. .................................. 83/175; 83/401; 83/423; 83/701; 83/925 R
[51] Int. Cl.[2] .......................................... B26D 5/00
[58] Field of Search .............. 83/175, 18, 171, 423, 83/701, 925 R; 29/423, 200 R, 200 A; 156/515

[56] References Cited

UNITED STATES PATENTS 2,966,086  12/1960  Sjostrom .............................. 83/175
3,306,144  2/1967  Nordgren ........................ 83/175 X

*Primary Examiner*—J. M. Meister
*Attorney, Agent, or Firm*—Steinberg & Blake

[57] ABSTRACT

A machine is disclosed for dressing in stretched condition continuous web materials on a plurality of frames, the machine comprising means for moving the continuous web through a given path intersecting the path of empty or stripped frames, provided with means for connecting thereto the continuous web after the path intersecting point, and wherein the means for moving the web through said given path comprise endless pin conveyors running on guides on the two sides of the machine and carrying the continuous web dressed on the pins at a predetermined tension.

22 Claims, 19 Drawing Figures

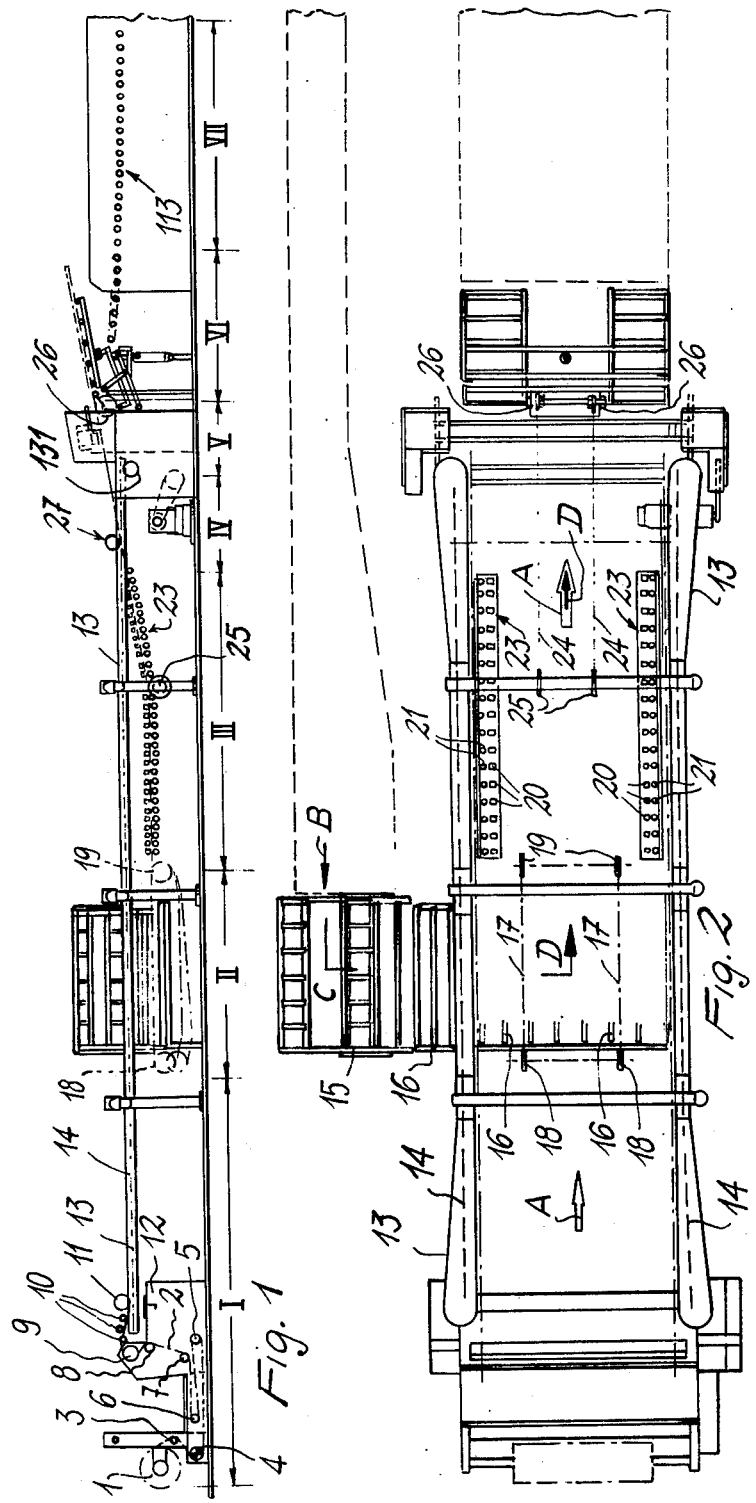

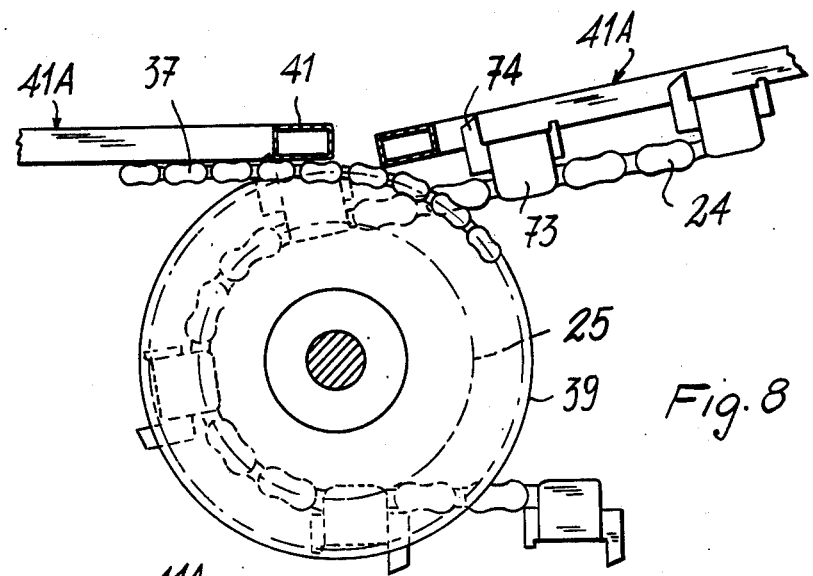
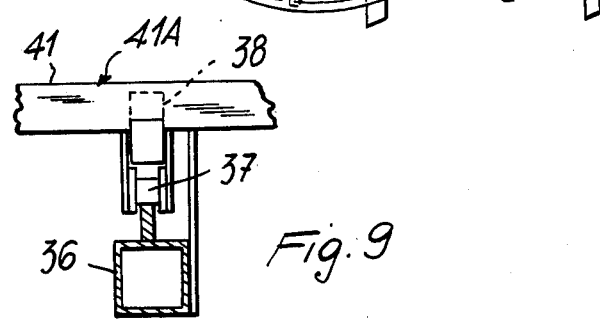

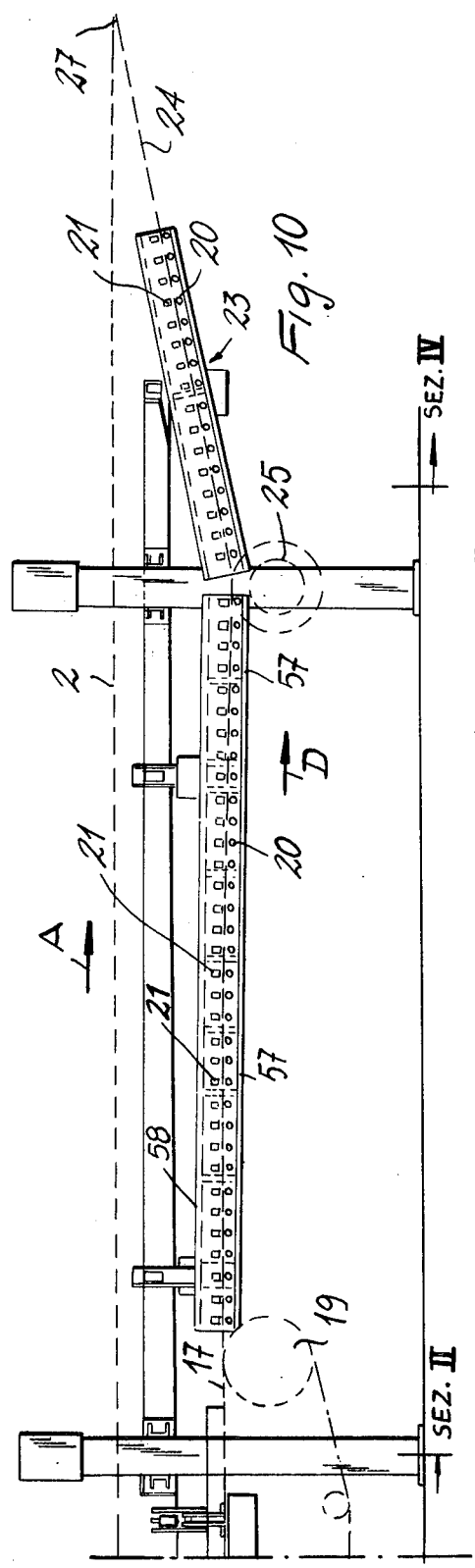
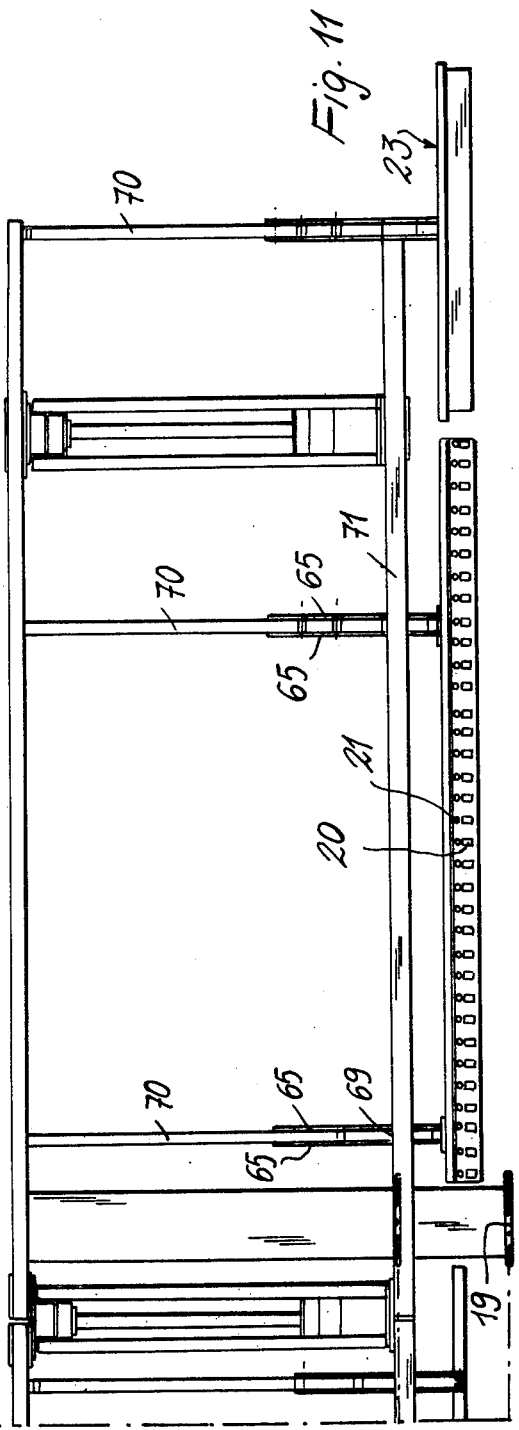

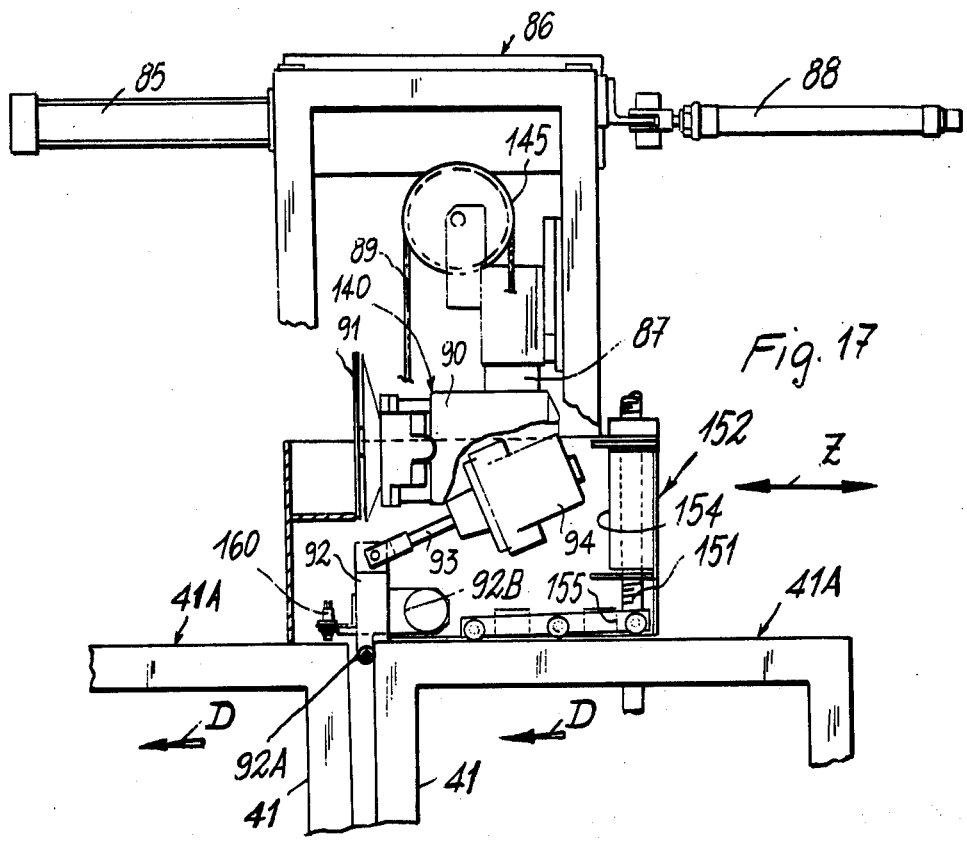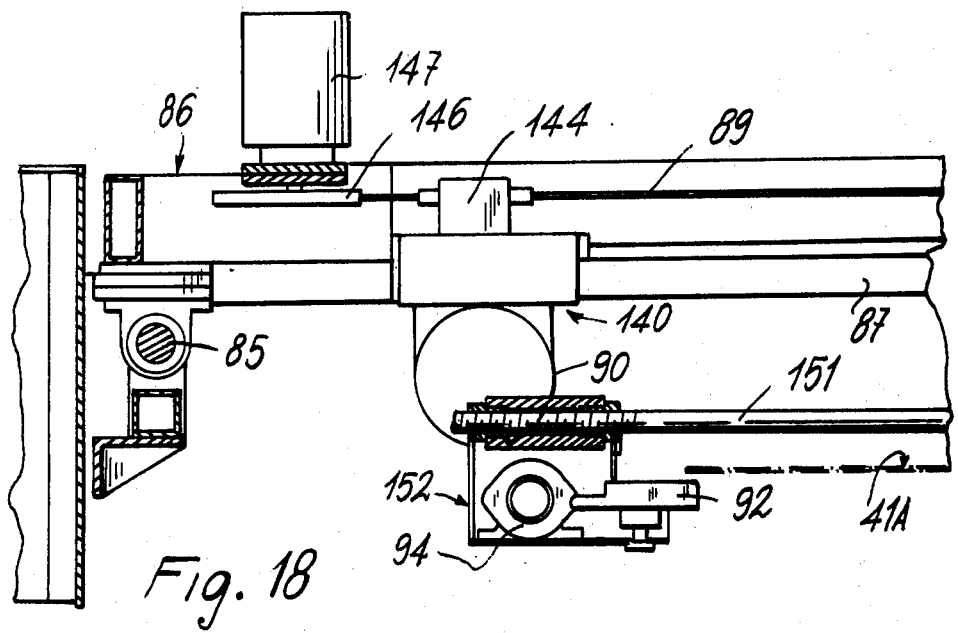

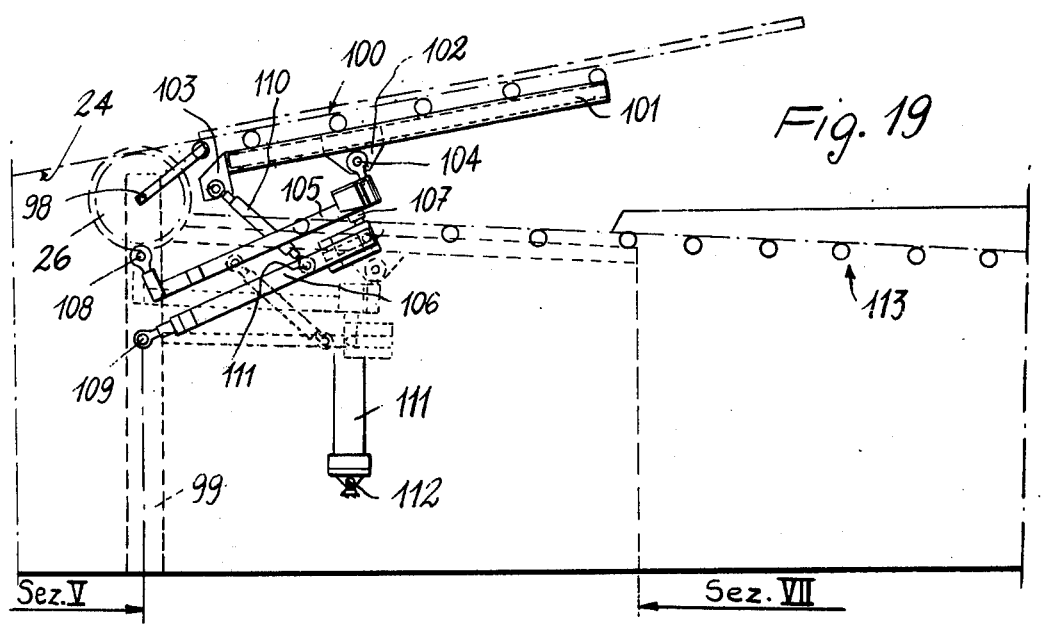

MACHINE FOR DRESSING CONTINUOUS WEB MATERIALS IN STRETCHED CONDITION ON A PLURALITY OF FRAMES

This invention relates to a machine for dressing continuous web materials in taut or stretched condition on a plurality of frames, and more particularly is concerned with a machine which is supplied on one side with a series of empty or stripped frames, on the other side being supplied with a continuous web of sheet or ribbon material, such as a textile material, and provides for dressing such a material on the frames, the latter presenting themselves at the machine outlet as separated from one another, each having the stretched material thereon.

In the following description reference will be expressly made to a textile product as continuous web material, and as frames use will be made of so-called pin frames comprising a rectangular frame having on one face and each side thereof a continuous or discontinuous row of pins, but, of course, the invention is not to be intended as restricted to the use of such frames.

The invention is particularly applicable to all of such cases where successive processings are to be given to materials, such as textile products, which however are not provided with a dimensional stability of their own, being capable of taking various forms, if not supported by suitable means.

A typical exemplary use of the invention is when having to handle such looped fabrics as those commonly referred to as "ROTOTUFF", comprising a loosely looped fabric, on only one face thereof having a terry which is held in place by a binding yarn interlacing with the bottom or under yarn to each loop, so that this terry, or eye or loop will lie on only one face of the textile product and be always blocked. Due to its own nature, such a fabric is very limp and capable of taking various configurations, so that, should lengths of said fabric be processed, the handling thereof would be extremely difficult with resulting risks of wastes, time consuming and so on.

Such a fabric is mounted or dressed on pin frames, capable of holding it in stretched condition, so that in lieu of the fabric the fabric carrying frame can be moved, thus substituting the frame rigidity for the poor dimensional stability of the fabric, thereby avoiding the above mentioned disadvantages.

This invention relates to a machine for automatically dressing such a fabric on frames, preferably frames of the above described character. Thus, a completely automated machine is provided with readily appreciated accompanying advantages and profits and which is capable of continuously operating, supplying at its outlet such frames as already dressed with textile material in stretched condition, which can be continuously fed to the machine.

Thus, by attaching the web to the frames dimensional stability is given to the web, as set forth above, thus facilitating transfer of the material through various processing apparatus. In addition the attaching of the web to the frames facilitates cutting the web between the frames while at the same time permitting subsequent molding of the web material which is attached to the frames.

In order to accomplish such objects, a machine is provided for dressing continuous web materials in stretched condition on a plurality of frames, comprising an inlet for the web material, formed as a fabric lifting machine, wherein the material is carried by two endless pin chains and stretched therebetween, characterized in that said material is caused to follow a given path, which is intersected by the path imposed by the frames, the paths penetrating after each other under said material, releasing it from the lifting machine chains and restraining it thereto, the frames then reaching a section of the machine where means are provided for cutting the material at the length between the rear side of one frame and the front side of the next subsequent frame, with its material stretched thereon each of the so separated frames then reaching an unloading station from which the frames are withdrawn, means being also provided for supplying empty or stripped frames to the machine.

Figure 4:
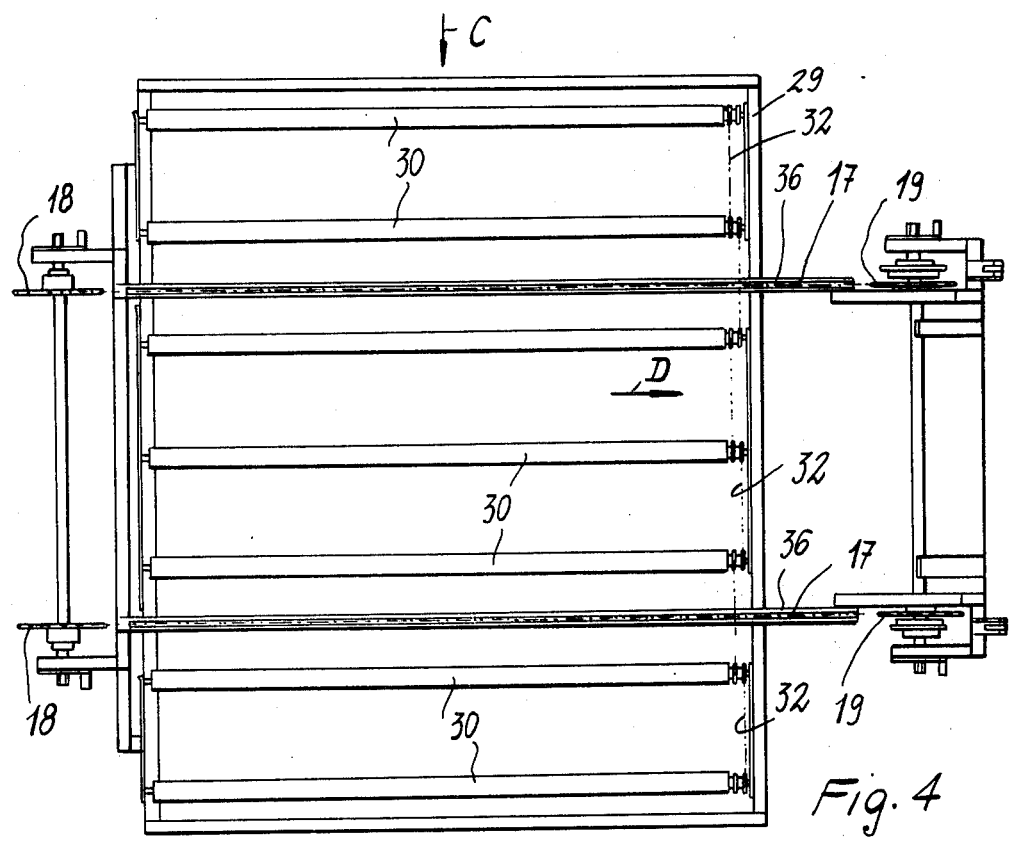
Figure 5:
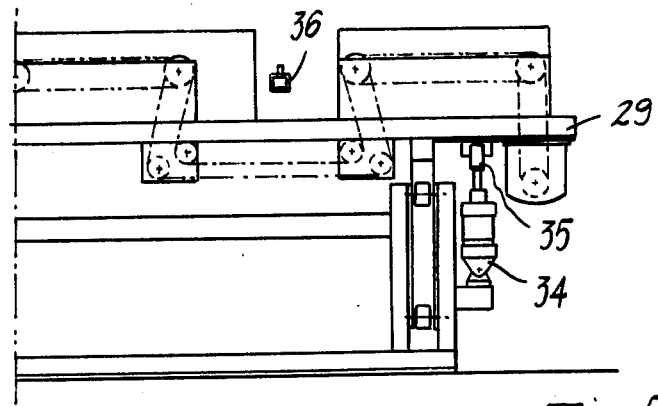
Figure 6:
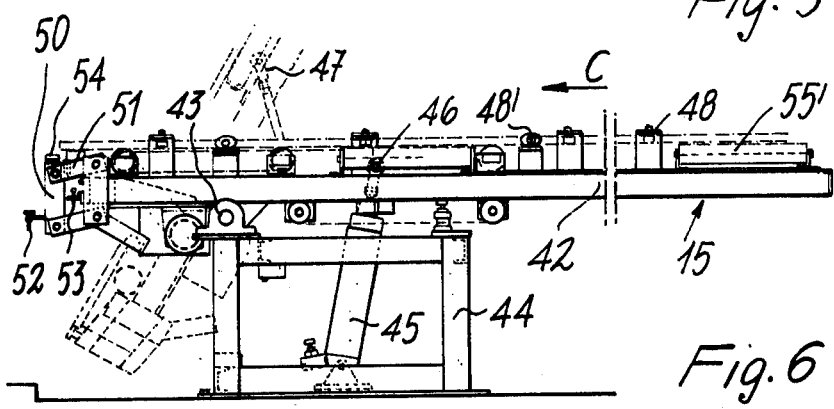
Figure 7:
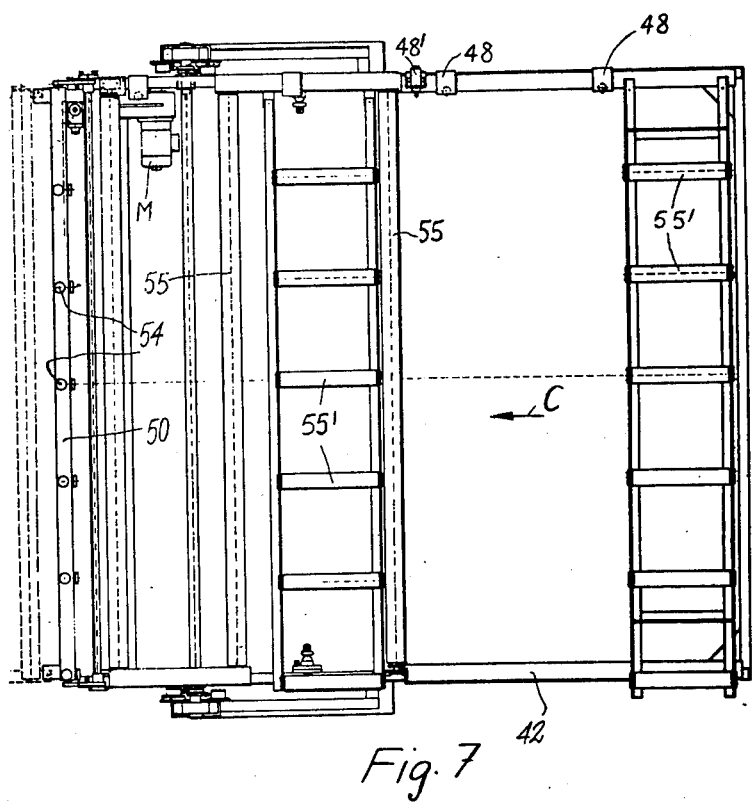
Figures 12, 13:
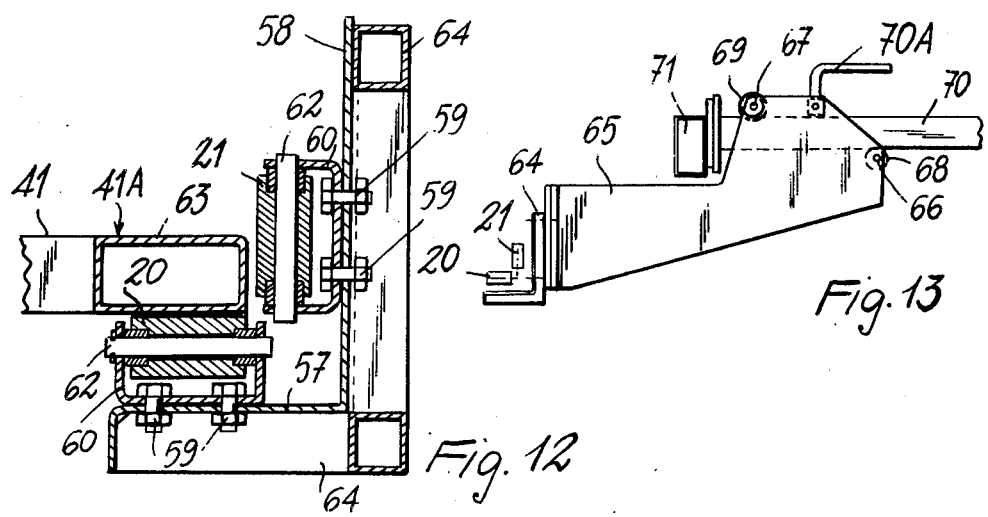
Figure 14:
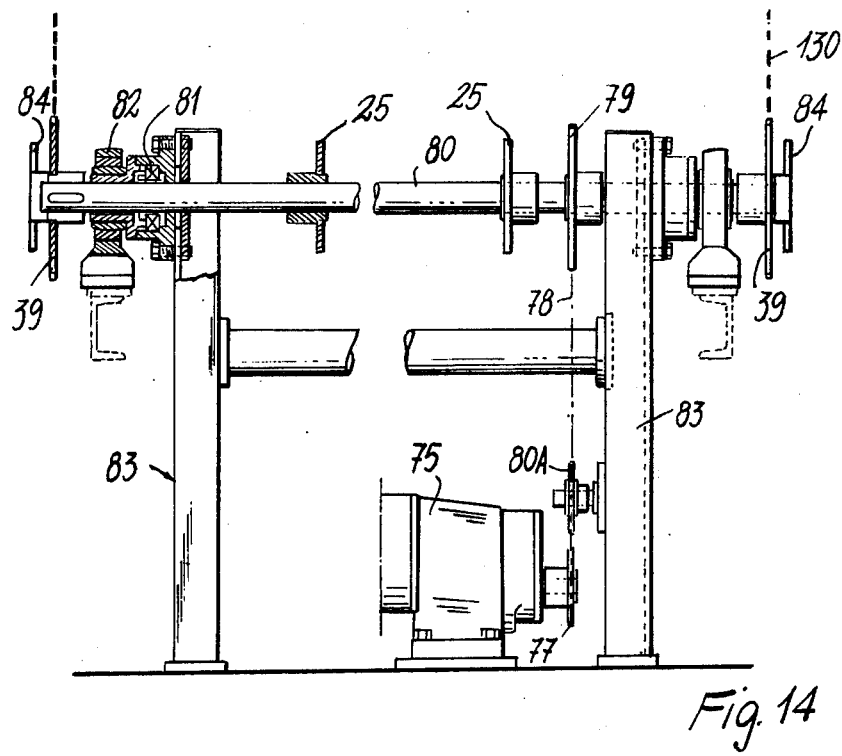
Figure 15:
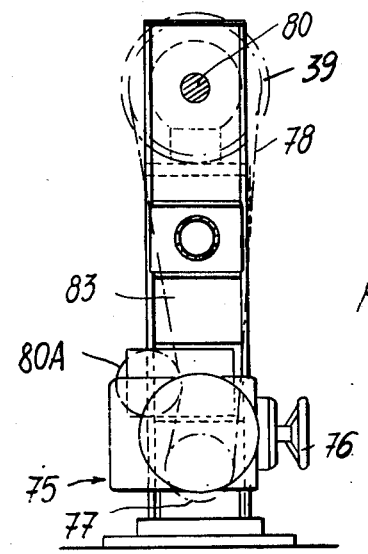
Figure 16:
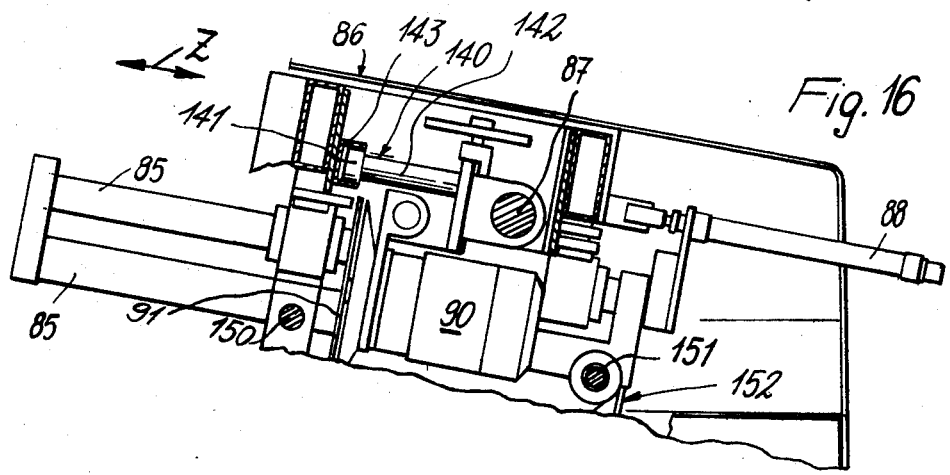

These and many other features of the invention will be more clearly understood from the following detailed description, given by mere way of unrestrictive example and with reference to the accompanying drawings, in which:

FIG. 1 is a diagrammatic side view of the machine;
FIG. 2 is a diagrammatic plan view of the machine;
FIG. 3 is a side view of the machine as seen at the frame introduction device;
FIG. 4 is a plan view of that portion of machine shown in FIG. 3;
FIG. 5 is a view taken along line V—V of FIG. 3;
FIG. 6 is a side view of the introduction device;
FIG. 7 is a top view corresponding to FIG. 6;
FIG. 8 is a detailed view showing the transport and drive chains;
FIG. 9 is a detailed view showing a guide for the transport chains;
FIG. 10 is a view, as taken from the longitudinal centerline of the machine, showing the transport section for the empty or stripped frames after introduction thereof;
FIG. 11 is a plan view corresponding to FIG. 10;
FIG. 12 is a detailed view showing the side frame-holder guides;
FIG. 13 is a detailed view showing the adjustable supports for the side frame-holder guides;
FIG. 14 is a detailed view showing the drive for the main transport chains;
FIG. 15 is a side view corresponding to FIG. 14;
FIG. 16 is a schematic sectional view, as taken along the longitudinal axis of the machine, showing the cutting device;
FIG. 17 is a plan view, with same cut away parts, corresponding to FIG. 16;
FIG. 18 is a cross-sectional view, with some parts cut away, of the device corresponding to FIG. 16; and
FIG. 19 is a schematic side view showing an embodiment for the delivery table or platform.

Reference should be first made to the diagram of the machine shown in FIGS. 1 and 2. In this diagram, for simplicity, the machine has been divided into several sections designated by Roman numerals.

Section I corresponds to the introduction of textile web material, which is assumed as wrapped on a bobbin 1, from which the web material, designated by numeral 2, is unwound passing to transmission rollers 3, 4, 5, 6, 7, 8, 9, 10 and 11, carried by sides 12, according to a per se known arrangement, common to the so-called lifting machines well known in textile industry. In this section of the machine, the textile material can be over- or under-supplied, so as to cause a possible stretching thereof, and in any case to bring it below the outlet roller at the desired tension conditions.

On the two sides of the machine and below roller 11, guides 13 are arranged and extend nearly throughout the length of the machine to the end of section IV. A chain or belt 14 runs in these guides and is driven by a suitable motor, as will become apparent hereinafter, this chain or belt 14 carrying, evenly distributed thereon, a series of steel pins, not shown, which penetrate the textile material carried thereon by roller 11, and hence move said textile material, maintaining it fully stretched and at the desired tension conditions imparted thereto by the first part of section I, throughout the machine width. As it will be seen, this section I generally corresponds to a per se known lifting machine, and therefore this section will not be further described, it being apparent that the textile material moves longitudinally of the machine in the direction shown by arrow A (FIG. 2), remaining stretched between the two transporting pin chains or belts 14, arranged on the two sides opposite of the machine, running through guides 13 and nearly throughout the length thereof, that is to section IV where, as it will be seen in the following, the textile material will be separated from the transporting pin chain or belt to be secured to frames being introduced into section II.

Said section II comprises the station for introducing frames below the moving textile web.

Said frames are of a suitable type; for example, reference will be made in the following description to pin frames as above cited at the beginning of the present text. Said frames largely comprise a sturdy frame, on one face carrying steel pins, and are fed to the introduction table or platform, generally designated at 15.

Inasmuch as the machine is capable of continuously operating, said frames can generally be those previously used and free of textile material that the machine according to the present invention has applied thereto, whereby at processing completion the stripped frames can be recycled to said introduction table or platform 15. Therefore, said frames can generally come from the direction shown by arrow B (FIG. 2), and when reaching on this introduction table or platform 15, they will travel a path at right angles to the former path, as shown by arrow C, by sliding on rollers 16, which position the frame below the textile material 2 moving as carried by said chains or belts 14. Upon reaching such a position, the frame is gripped by fingers provided on endless chains 17, the latter being entrained on drive and transmission wheels 18 and 19, while said chain fingers provide for urging, or propelling the frame in the direction shown by arrow D on roller guides 20 and 21 (in section III), divided into an initial slighty downwards sloping length, where said "propelled" frame moves by inertia, and into a rising length 23, delivering it to the level of the coaxial sprocket wheels 22, 25, along which the frames are moved as driven by chains 24 provided with teeth 74 meshing with the cross elements of lengths 41A. Such endless chains are also entrained about wheels. Thus, it will be seen that the path for the empty or stripped frames will intersect from below the path for the textile material, as specified by guides 13.

Thus, section IV is reached, this section corresponding to the area where the frames contact the textile material, penetrating therebelow. The cross size of the frames is less than the cross distance between the pin carrying chains or belts, so that the frames can move to within the guides 13. Thus, on continuing the path thereof along said rising length 23, the frames will penetrate between guides 13 and by the upper face thereof will contact the lower face or underside of textile material 2 moving thereon. Thus, the pins provided on the frame will grip in the textile material. On continued upward movement, the edges of the textile material will become separated from the pins of chains 14, so that said textile material will leave said chains 14, but remaining at the same previous tension conditions restrained to the frames, the latter continuing their upward path moving to station V.

It will be appreciated that, inasmuch the frames are continuously introduced, along the frame path there will be not only one frame, but a series of frames after one another, so that following the intersection point 27 of the empty or stripped frame path with the path of the continuous web, there will be a series of frames after one another, as dressed with the textile material, the latter being still continuous.

Thus, section V is reached, where the textile material is cut transversely of the machine, in the space between a frame and the next subsequent frame, or more particularly between the rear side (as seen in the feeding direction) of a frame and the front side of the next subsequent frame. In the exemplary embodiment shown, as will become more apparent in the following, cutting operation is effected by means of a rotary blade or a heated guillotine blade. Then, following section V, the frames are still upward moving and each of the frames are dressed with a portion of textile product, each portion of textile material on each of the frames being separated from the continuous web.

Thus, section VI is reached, where provision is made for an unloading table or platform which, as soon as a frame has arrived thereon, provides through a hydraulic connecting rod and piston system to lower, to lay the frame onto a further outlet transporting chain, comprising section VII, and to immediately raise in readiness to accommodate a new frame from section V. From said section VII, the frames can be withdrawn, or be supplied through the same conveyor belt to successive processings.

Having now generally described the schematic operation of the machine according to the present invention, the operation and features will now be more particularly considered, which, to facilitate in understanding the machine, will be made separately section by section, it being however understood that this is only a descriptive espedient, the machine having to be considered in its entirety.

FIRST SECTION

As above stated, section I corresponds to a lifting machine of well known type in textile industry, and therefore in addition to the brief notices previously supplied, reference is expressly made to such lifting machines, so that this section will not be further described.

SECOND SECTION

In this section, the frames are introduced below the plane on which the textile material is moving and is then to be dressed on the frames. In describing this section, FIGS. 3 to 9 will be particularly referred to.

In this section (FIG. 3), below the level at which textile material 2 is moving, a roller plane or platform, generally designated at 28, is arranged and, as will be seen hereinafter, is capable of taking two positions, namely a higher position and a lower position, corresponding to the empty frame introducing step and to the empty frame unloading or ejecting step, respectively. This roller plane or platform comprises a frame 29 having rollers 30 arranged thereon, the rollers being arranged with the axis thereof lying on a plane. Said rollers 30 are rotably driven by means of a motor 31 and chains or belts 32 (as shown in FIG. 5), so that a frame introduced from the outside by means of an introduction device, to be discussed hereinafter (FIG. 6), is driven in the direction shown by arrow C (FIG. 4) until bearing on the roller plane or platform at a given position by abutments or detents, not shown, and suitably secured to the edges of frame 29. Advantageously, such abutments, which may also comprise limit switches for cutting off the effect of motor 31, will be located at adjustable position for accomodating the various sizes of the frames.

The frame 29, carrying said roller plane or platform 28, is connected through load distributing plates or similar means 33 to hydraulic or pneumatic cylinders 34 by the stems 35 thereof. Said hydraulic pistons in cooperation with vertical guides can cause said frame 29 and as a result said roller plane or platform 28 to take two positions, particularly an introduction position, in which the plane or platform is raised, and a frame starting and ejecting position, where the plane or platform is lowered. The control to said hydraulic pistons can be supplied by electrovalves and a circuit, not shown, by limit switches operated by the frame when the latter is correctly positioned. Under these conditions, the limit switch enables pistons 34 to take a lowered position, and accordingly also said roller plane or platform 28 with the empty or stripped frame correctly positioned thereon. Fixed guides 36, having said chains 17 sliding thereon, are arranged parallel to rollers 30 and intermediate pairs of adjoining rollers. Fingers 38 are connected to a number of links of said chains 17, that is carrying a projecting finger or tooth raising above the chain link, which chain is entrained about transmission wheels 18 and 19, driven by a suitable motor, for simplicity not shown in said figures of the drawing.

The lower run of chain 17 is below the assembly comprising said frame 29 and rollers 30, whereas the upper run, sliding as driven by guides 36, is at the top of said frame (FIG. 5), and anyhow at such a position that, when frame 29 is at top end of stroke position, the plane identified by the highest generatrices of rollers 30 lies above chain 17 and fingers 38, so that, even if chain 17 is moving, said fingers 38 will not engage the frames positioned on roller plane or platform 28. It will be now readily appreciated that when frame 29 is lowered under the action of hydraulic piston 34, fingers 38 will engage against cross sides 41 (FIG. 8) of empty or stripped frames 41A, whereby the latter are moved in the same direction as the upper run of chain 17, that is in the direction shown by arrow D. Advantageously, the speed of chain 17 would be high, so that the frames are nearly "propelled" in the direction shown by arrow D, and then supplied to the next subsequent section III. Thus, said frames will rapidly leave said roller plane or platform 28, after a change of direction by 90° from the introduction direction shown by arrow C to the outlet direction shown by arrow D.

Once a frame has left roller plane or platform 28, it releases an electrical contact member (not shown), which controls through hydraulic pistons 34 the lifting movement of frame 29 to its top position, and said roller plane or platform 28 is ready to receive a new frame. Introduction of empty or stripped frames onto the roller plane or platform 28 on the direction shown by arrow C is accomplished by an introduction table 15, which is located laterally of the main body of the machine and shown in FIGS. 6 and 7. Said introduction table 15 comprises a frame 42 pivoted on an axis 43 parallel to the longitudinal axis of the machine. Axis 43 is fast with a fixed supporting structure 44 carrying a hydraulic piston 45, the other end of which is pivoted at 46 to frame 42. Depending on the position of hydraulic piston 45, said frame 42 can take two positions, namely a horizontal or nearly horizontal low position, where said frame is coplanar with plane or platform 28 specified by rollers 30, and another position near to vertical, also shown in FIG. 6 but with dashed lines, when the hydraulic cylinder is extended according to the line shown in FIG. 6 and specified by reference numeral 47. Frame 42 comprises end of stroke rollers 48 for stopping the stroke or run of frames from a direction perpendicular to the drawing plane of FIG. 6, and other sealing or holding rollers 54 at said rollers 30, and mounted on a movable cross piece 50, which can take two positions, of which one is a stop position shown by dashed lines in FIG. 6, and the other is a free exit position shown by full lines in said figure.

To this end, said cross piece 50 is secured to frame 42 by links 51 forming an articulated parallelogram. A check screw 52 is secured to cross piece 50, and a grub-screw 53 is fast with frame 42. By this arrangement, when the introduction table is raised (dashed lines), screw 52 will collide against a suitable detent and cross piece 50 will be at its highest position, so that rollers 54, carried thereby, will prevent frame 41 from falling down, and screw 53 will adjust the exact position of the cross piece by acting on one of said links 51.

When introduction table or platform 15 is horizontal, said cross piece 50 will take the position as shown by full lines in FIG. 6, and a frame will be free to move in the direction shown by arrow C. On said introduction table or platform there are provided rollers 55 and 55', having the axes thereof at right angles to each other, so as to allow the frame movement both in the direction shown by arrow C and in the direction shown by arrow D. Advantageously, by means of an electric motor M and a series of mechanical means, such as chains or the like, rollers 55 can be rotated to move the frames in the direction shown by arrow C and introduce the same onto the roller plane or platform 30.

By this arrangement, when an empty or stripped frame in arrival by any system from a direction perpendicular to the plane of FIG. 6, arrives at the introduction table or platform, rollers 55' will aid such a frame in sliding in a direction perpendicular to the plane of FIG. 6, until the frame collides against rollers 48, while being prevented from falling down by rollers 54, frame 42 being at raised position. When the frame stops its travel or movement and is positioned on the introduction table or platform, it will operate a limit switch 48' placed on or at at least one of the sides of frame 42, and said hydraulic piston 45 is operated, so that the introduction table or platform is lowered, taking its lowered position bringing it at said plane or platform 28. As frame 42 reaches this position, cross piece 50 is lowered, thus allowing frames 41 to begin to move in the direction shown by arrow C, as propelled by rollers 55 driven by motor M, moving from said introduction table or platform to roller plane or platform 28, whereupon the above described cycle begins.

Accordingly, in this section it is provided to introduce a frame from the outside in the direction shown by arrow C, whereupon the frame is moved longitudinally of the machine, that is in the direction shown by arrow D, then being supplied to the next subsequent section III, by moving in the same direction of the textile material moving at the top thereof.

THIRD SECTION

This section provides for receiving from the introduction section II and transferring such frames along guides to an upward moving chain, to be discussed about hereinafter, to a location 27 of encounter with the textile material moving over the empty or stripped frames.

This section is illustrated in FIGS. 10 to 15.

Particularly referring to FIG. 10, the frames from the introduction device are propelled by chain 17 in the direction shown by arrow D and enter the roller transporting guides, herein generally designated by reference numeral 56. The guide of FIG. 10 is illustrated as seen from the inner side of the machine, this for a viewer being at the longitudinal centerline of the machine according to the present invention. Of course, and also referring to FIG. 11, the machine comprises a pair of such guides on either side of the machine. Roller guides 20, 21 comprise a strong angle iron having a horizontal side 57 and a vertical side 58 (see also FIG. 12). By bolts 59, said angle irons have restrained thereto two series of U-shaped orthogonal forks 60, on which said rollers 20, 21 are freely rotable about axes 62. Thus, a roller guide is provided for accomodating the longitudinal sides (that is parallel to the longitudinal axis of the machine) of frames 41A, these longitudinal sides being designated in FIG. 12 by reference numeral 63.

Said roller guides are arranged for adjustment, that is for being moved to and away from the machine centerline, to accomodate the transverse size of the frames. To this end, sides 57 and 58 of the roller guides are restrained to a framework 64 (FIG. 13) which, in turn, is restrained to gussets 65 outwardly and then upwardly projecting. At the outermost and uppermost end of gussets 65, which are arranged in pairs, rollers 68 and 69 are pivoted at 66 and 67, respectively, these rollers operating by transferring the weight thereof on a guide 70 which is restrained to the stationary framework 71 of the machine, so that said gussets 65 along with the roller guides can take positions more or less close to the machine centerline.

Of course, the position for the roller guides would be preset depending on the frame width and gussets 65 would be secured at the most suitable position by any means, such as set dowels, set screws or any other suitable means, as designated at 70A.

At wheels 22, 25, the length or section 23 for the roller guide travel begins, so as to move the frames to location 27 of encounter with the textile material 2 moving thereon, which will be discussed in the next following section IV.

Of course, in said length or section 23 the roller guide is quite identical to the previously described length or section.

The forward movement of the frames along the path given thereto by the roller guides, partly occurs by propulsive thrust or push of chains 17, and partly in the upward length of chains 24. These chains 24 carry small blocks or inserts 73 as restrained to a number of links and evenly lengthwise distributed, said small block or inserts 73 carrying a lug or projection 74 urging the transverse sides 41 of empty or stripped frames 41A, thus causing the latter to travel the path imposed thereto by said roller guides. Chains 24 are entrained about gear wheels 24 which are coaxial and fast with driving wheels 39 of chains 37 rotatably driving wheels 19 through gear wheels fast with the latter, but not shown for the sake of simplicity. Gear wheels 24 (FIG. 14) are driven by an electric motor 75 provided with a variator which can be controlled by a handwheel 76.

The output shaft of the variator has a sprocket wheel 77 keyed thereto, on which a chain 78 is entrained and drives a gear wheel 79 restrained to a shaft 80, to which gear wheels 25 are also keyed. A transmission or turnbuckle 80A is also provided.

Shaft 80 is rotable in bearings 81, 82, the stationary part of which is connected to the main machine framework, generally designated at 83. In addition to wheels 39, shaft 80 has gear wheels 84 keyed to its free ends on both sides, the last mentioned gear wheels providing through chains 130 and wheels 131 for driving said endless pin chain 14 which provides for carrying the textile material 2 (see section I).

By this arrangement, gear wheels 39, 74 and 84 will rotate in the same direction, and therefore the carrying chains and endless pin chains 14 will move forward in the same direction and at the same speed, and correspondingly both the textile material 2 and empty or stripped frames will move forward in the same direction or at the same speed. On the other hand, as will be clearly seen from FIG. 8, since gear wheel 25 is provided with a smaller diameter than wheel 39, chains 17 will move at a higher speed than chain 24, thus obtaining that effect of "PROPELLING" of the empty or stripped frames from the introduction section to the main carrying chain, as referred to in connection with section II.

Thus, at the outlet of this section III, there will be empty or stripped frames moving below the textile material in the same direction and at the same speed as the textile material, and such frames will enter the upward length of the roller guides, designated by reference numeral 23, moving to said location 27 of encounter with the textile material.

FOURTH SECTION

In this section, the empty or stripped frames encounter the textile material, the latter leaving the endless pin chain to transfer at stretched condition onto the pin frames, subsequently arriving from below the textile material, then continuing to move in upward direction.

No particular illustrations are needed to understand this section, it being sufficient to refer to FIG. 1. Thus, it will be readily appreciated that roller guides 23 continue to move upwards to pass beyond the plane of textile material 2, while still remaining, as shown in FIG. 2, within the side guides 13 of said endless pin chains 14. Thus, the frames will continue to move in upward direction but, on reaching location 27, the transverse side 41, which is the front or leading side (in the feeding direction) of the frame, when reaching such a location will encounter the textile material 2, and continuing its upward travel will firstly cause its pin to penetrate the textile material, and then continuing its upward travel, will strip the textile material edges externally of the frame from the pins of the endless pin belt, and so on throughout the frame length and the rear transverse side of the frame, and then the next subsequent frame, so that at the outlet of this section there will be frames moving along the upward track or travel having the textile material restrained thereto, this material being at stretched condition in the frames and still in a continuous web, whereby at the empty section or length between the rear side of a frame and the front side of the next subsequent frame there is a length of textile material. Thus, the following section V is attained, which is the true cutting section, just at the free textile material length between one frame and the next subsequent one.

FIFTH SECTION

This section accomplishes its function by a flying blade device, that is by a device wherein a carriage is arranged above the textile material to be cut and the whole carriage can be moved in the same feeding direction as the textile material, and additionally and at the same time can move transversely of the direction of movement for the textile material carrying out a cutting operation. According to alternative approaches, the textile material and frames can be stepwise forwardly moved, such as by providing the main motor of the machine with an electromagnetic clutch or any other preferred means. The cutting device used in the present invention is particularly shown in FIGS. 16 to 18.

Referring to these figures of the drawings, parallel to the longitudinal direction of the machine, that is parallel to the movement direction of the frames and textile material restrained thereon, guides are arranged on both sides of the machine, which guides may be tubular guides 85 as shown in FIG. 16. A bridge member, generally designated by reference numeral 86, is straddled transversely of these tubular guides, and therefore can move in the same direction or in opposite direction to the feeding direction of the frames and textile material (arrows Z).

This bridge member carries guides, such as a tubular guide 87, along which a carriage 140 is slidable and can move from one to the other side of the machine. The carriage is also guided by rollers or wheels 141 carried by pins 142 attached to the bridge member and movable along a channel 143 also attached to said bridge member. The movement of the bridge member and carriage may be whatever, it being possible for example to use hydraulic or pneumatic pistons, chains, or any other suitable drive means. In the exemplary embodiment shown, a hydraulic piston 88 is used for longitudinal movements of bridge member 86, and a chain drive 89 for transverse movements of the carriage.

The chain is fast with carriage 140 through a body member and passes on wheels 145, 146 carried by bridge member 86. Wheel 146 is rotatably driven by a geared motor 147, the direction of rotation of which is reversable. A motor 90 is fast with the carriage and rotably drives a blade 91 intended for cutting the fabric.

Let us now assume that the bridge member and carriage are at the position shown in FIG. 17, while frames 41A are moving along the machine in the direction shown by arrows D.

By a pair of shafts 150, 152 said bridge member 86 carries two box-like members 152 arranged on either side of conveyor 24. These box-like members can be moved to and away from each other to accomodate the interspacing thereof to the width of frames 41A as time by time used. To this end, shaft 152 has a double thread meshing with screw threaded bushings 154 carried by the box-like members. When this shaft 152 is rotated by a crank, not shown, the above mentioned movement for box-like members 152 is provided. These box-like members 152 carry a sensor 92 provided with a roller 92A and are rotable about an axis 92B. They carry a roller-holder fillet or strip 155 which can be resiliently pressed with a limited travel against the longitudinal sides of frames 41A.

Sensor 92 is connected to a piston 93 of a pneumatic cylinder 94, which is controlled as more apparent from the following. A microswitch 160 is also connected to said sensor 92 and accomplishes a function to be explained hereinafter. This sensor 92 is moved to the outer side of the frames by the action of piston assembly 93, 94, and when it encounters the empty space between a frame and the next subsequent one, it penetrates into said space, taken the position as shown in FIG. 17.

As sensor trips to this position, microswitch 160 is closed, and accordingly the cutting device is operated with accompanying operation of blade 91, transverse movement of carriage 140, and at the same time the textile material will be cut in the space between a frame and the next subsequent one. Should the frames be continuously moved, then the microswitch would simultaneously provide for moving said bridge member 86 parallel to the path of frames 41A, so that the bridge member would follow the frames as the latter move, while should the frames be stepwise moved, then such an expedient would be unnecessary. Conveniently, the direction of rotation for blade 91 is such that the textile material is held downward urged to the frame to avoid any risks of the textile material being stripped from the pin frame.

In a preferred embodiment, during cutting operation the bridge member will move along longitudinal guides 85 at the same time as the frames, whereas the carriage provides for transversely carrying out the cutting operation. After cutting, the bridge member will be at the outer end of its travel, and the carriage will be at the opposite end of the machine with respect to the starting position. On reaching this position, the carriage encounters a microswitch, not shown for the sake of simplicity, which energizes a first circuit providing for temporarily disengaging sensor 92 from the space between the two frames, reversing the direction of rotation for blade 91, and reversing the direction of longitudinal motion of bridge member 86 produced by automatic piston 88. Following this, the bridge member immediately begins its longitudinal return travel, and at the same time said sensor 92 is pressed again against the side edge of the frames, and the bridge member will continue its return travel, until the sensor encounters a new space between two adjoining frames. On reaching this position, said sensor 92 will again penetrate into the space between the two frames, and carriage 140 will begin its return travel, which will be again a positive or active travel, thus providing for a new cut subsequent to the former, that is behind the cut previously made and before the next subsequent incoming frame. At the end of its travel, the carriage is returned to its initial position, so that the cycle is resumed with a new longitudinal return travel of the bridge member, and a new cutting stroke of the carriage. At each transverse travel of the carriage, there will be a reverse in the direction of motion both for the carriage and the blade, and each to-and-fro travel of the carriage will be an active or cutting travel, while the whole bridge member is returned to start position after each cut. Of course, the speeds for the bridge member, cutting operation and frames should be suitably selected in order to avoid any interferences. Advantageously, the device will comprise side aprons, bridge member coverings, as well as carriage shielding, in order to avoid any accidents to the operators assigned to this section.

Thus, the cutting device provides for separating the textile material in the space from a frame and the next subsequent one, so that at the outlet of this section the frames are moving each with its own textile material dressed thereon, will be quite independent of one another, continuing to move along the upward roller guides 23, and will be brought from section V to the next or unloading section VI.

According to a variation, the bridge member carries an oscillating frame having its axis transversely arranged to the longitudinal direction of the machine. Said frame, controlled by hydraulic pistons which, in turn, are controlled by above described sensing devices, carries a guillotine blade, which moves down to cut the textile material between two pin frames subsequently arranged. Advantageously, according to a per se known arrangement, said blade can be heated by sectors, so as to provide for cutting the textile material by combined action of the blade and melting of the material comprising the textile material, when the latter is a synthetic material, as it is generally the case. By this operation, the cut loops of fabric can be also blocked by melting, thus preventing runs and frayings on the edges of the textile material now cut.

SIXTH SECTION

Section VI is an outlet section of the machine, comprising a roller delivery table or platform, providing for receiving the upward moving frames, and lowering for bringing such frames back or nearly back to horizontal attitude, and then supplying the frames to a final outlet and use conveyor belt.

Referring to FIG. 19, section VI is particularly shown.

The frames, each of which having its own textile material dressed thereon and separated from one another due to the cutting devices of section V, are upward moving along chain 24 at the outlet of the cutting section. This chain is coupled to sprocket wheel 26, so that, assuming that the frames are moving, such frames proceed along chain 24 presenting a cantilever portion beyond the vertical plane containing axis 98 of wheel 26 pivoted to one of the uprights 99 of the stationary main frame of the machine. Beyond said vertical, the frames encounter a delivery table or platform, generally designated by reference numeral 100, which can take two positions, an upper or loading position where said table or platform is substantially aligned with chain 24, and a lower or delivery position where said table or platform is substantially aligned with an outlet conveyor belt or chain comprising the next subsequent section VII. Said delivery table or platform consists of a framework 101, at the top having rollers arranged with the axis thereof transversely of the machine, these rollers defining a top plane on which, when said delivery table or platform is at loading position, will have the frames from chain 24 bearing thereon. At suitable position, said framework 101 has downward projecting gussets 102 and 103 applied thereto. Hinged or pivoted to gusset 102 is the apex 104 of an articulated quadrilateral comprising connecting rods 105 and 106 which are interconnected by a connecting rod 107, the other end of said connecting rods 105 and 106 being pivoted at 108 and 109, respectively, to a fixed location of the machine, such as framework 99. A further connecting rod 110 is connected between a suitable location 111 of connecting rod 106 and gusset 103 fast with said delivery table or platform 101.

A hydraulic or pneumatic cylinder 111 is pivoted at 112 to a fixed part of the framework, and the free end of its stem is pivoted to a gusset fast with the framework 101 at a location not shown in FIG. 19, because of being behind gussets 102. Owing to this articulated quadrilateral mechanism, when on control of hydraulic cylinder 111, the piston of the latter takes the top dead center and bottom dead center, respectively, said delivery table or platform 100 will correspondingly take two positions, that is the upper loading position shown by full lines in FIG. 19, and the lower delivery position shown by dashed lines in said FIG. 19. The control to cylinder 111 can be imparted by any means, for example by a microswitch operated by the frames as the latter reach a suitable position on said delivery table or platform 100, which position can conveniently be some part of the cantilever frame, so that when said delivery table or platform passes from loading to delivery position, a part of the frame will bear on the outlet conveyor belt. As the frame has been delivered, another microswitch will reverse the flow to cylinder 111, thus causing the delivery table or platform to resume the initial position, ready for receiving a new frame in the meantime in arrival from conveyor chain or belt 24. Advantageously, the delivery position of the delivery table or platform will be downward sloping, so that the frames can move to the outlet conveyor belt by gravity, but of course it would always be possible to provide said delivery table or platform with a conveyor belt which may be fully identical to that previously described. Accordingly, at the outlet of this delivery section, the frames are no longer upward moving, but are horizontally or slightly downwardly moving, depending on the desired sloping for the outlet conveyor belt comprising the next subsequent section VII.

SEVENTH SECTION

This section needs no particular illustrations, because of simply comprising a conveyor belt, generally designated at 113 in FIGS. 1 and 19, which conveyor belt may be of any known type, or even a conveyor chain similar to that previously described, which will supply the frames having the textile material dressed thereon to the successive processings, according to the scopes and objects of the present invention.

What is claimed is:

1. A machine for dressing, in stretched condition, continuous web materials on a plurality of frames, comprising means for moving a continuous web along a given path and means for moving along a second path intersecting said given path at an intersecting zone stripped frames, provided with means for connecting thereto the continuous web after the path intersecting zone, and wherein the means for moving the web along said given path comprise endless pin conveyors having pins for piercing through the web and guides respectively guiding said conveyors and located respectively at opposite sides of the machine, said conveyors carrying the continuous web dressed on said pins at a predetermined tension.

2. A machine as claimed in claim 1, wherein to predetermine the tension of the continuous web, the machine has an inlet comprising a lifting machine.

3. A machine as claimed in claim 1, wherein said means for moving the frames move the latter along said second path at the same speed as the continuous web, sliding guides guiding said frames, the transverse size of said frames being less than the transverse spacing between said pin conveyors, and said second path passing through the zone intersection with the path of the continuous web.

4. A machine as claimed in claim 1, wherein said frames are provided on one face thereof with pins.

5. A machine as claimed in claim 4 wherein the pins on said face extend in the same direction as the pins of the pin conveyors carrying the continuous web.

6. A machine as claimed in claim 1, and introducing means for introducing said frames laterally of the machine.

7. A machine as claimed in claim 6, wherein said introducing means comprises a loading table having two positions, one for receiving stripped frames, and a second position for introducing said stripped frames into the machine below the moving continuous web.

8. A machine as claimed in claim 7 wherein said loading table has frame positioning means, and release means for releasing a frame from said positioning means, when said table is at a position for supplying the frames to the machine.

9. A machine as claimed in claim 8, wherein said release means comprise tiltable edges and hydraulic pistons controlling said tiltable edges, and limit switches operated by said position of the loading table and controlling said hydraulic pistons.

10. A machine as claimed in claim 7, wherein a roller table is arranged parallel to the direction of movement for the continuous web, and below the latter, for receiving the frames from the loading table, said roller table being provided with advancing means for longitudinally moving the frames in the desired in the desired direction.

11. A machine as claimed in claim 10, wherein said advancing means comprise endless chains provided with fingers for applying a thrust on cross sides of a frame when contacting therewith.

12. A machine as claimed in claim 11, wherein said roller table has two positions, an upper position where said fingers are not in engagement with the frames and where said roller table is substantially coplanar with the loading table, and a lower position where, as the fingers move, such fingers can engage said cross sides of the frame.

13. A machine as claimed in claim 12 wherein in the direction along which said web is moved and laterally of said roller table, roller guides are arranged and provided with conveyor chains having teeth for urging the frames from said roller table.

14. A machine as claimed in claim 13, wherein the speed of said conveyor chain at said roller guides is the same as the feeding speed of the continuous web.

15. A machine as claimed in claim 14, wherein the operating speed for the chains of said advancing means for moving the frames from the loading table to the roller guides is higher than that of the continuous web.

16. A machine as claimed in claim 13, wherein beyond the zone of intersection said roller guides continue to a cutting station, and cutting means at said cutting station having a cutting blade for cutting the web between one frame and the next subsequent frame.

17. A machine as claimed in claim 16, wherein a sensing means provides an operating control for said cutting blade and is capable of entering the spacing between the rear cross side of a frame and the front cross side of the next subsequent frame.

18. A machine as claimed in claim 17, wherein said blade is a flying blade having a direction of rotation which is always such as to maintain the web on the frame.

19. A machine as claimed in claim 17, wherein said blade is a guillotine blade.

20. A machine as claimed in claim 16, wherein following the cutting station a delivery table is provided and has two positions, one a position forming a continuation of the roller guides, and a second position where said delivery table deposits the dressed frame onto an outlet conveyor belt.

21. A machine as claimed in claim 20, wherein an articulated quadrilateral is operatively connected with said delivery table for operating the same and a hydraulic piston operatively connected to said quadrilateral for driving the same.

22. A machine as claimed in claim 21, wherein a control means is operatively connected with said hydraulic piston for controlling the same, said control means including contacts operated by the position of the frames.

* * * * *